US005600473A

United States Patent [19]

Huber

[11] Patent Number: 5,600,473
[45] Date of Patent: *Feb. 4, 1997

[54] OPTICAL AMPLIFIER SYSTEMS WITH ADD/DROP MULTIPLEXING

[75] Inventor: David R. Huber, Annapolis, Md.

[73] Assignee: Ciena Corporation, Savage, Md.

[*] Notice: The term of this patent shall not extend beyond the expiration date of Pat. No. 5,555,118.

[21] Appl. No.: 394,340

[22] Filed: Feb. 24, 1995

Related U.S. Application Data

[60] Continuation-in-part of Ser. No. 367,432, Dec. 30, 1994, Pat. No. 5,557,442, which is a division of Ser. No. 071,263, Jun. 4, 1993, Pat. No. 5,579,143.

[51] Int. Cl.$^6$ .......................... H04B 10/16; H04B 14/02; H01S 3/00
[52] U.S. Cl. .......................... 359/179; 359/130; 359/174; 359/341; 385/10
[58] Field of Search .......................... 359/124, 125, 359/126, 127, 128, 130, 173, 174, 179, 349, 333, 341; 385/10, 15, 18, 24, 37, 47, 31

[56] References Cited

U.S. PATENT DOCUMENTS

| | | | |
|---|---|---|---|
| 4,642,804 | 2/1987 | Personick | 370/3 |
| 4,644,145 | 2/1987 | Gundner | 250/201 |
| 4,769,833 | 9/1988 | Farleigh et al. | 379/105 |
| 4,775,971 | 10/1988 | Bergmann | 370/3 |
| 4,891,694 | 1/1990 | Way | 358/86 |
| 4,963,832 | 10/1990 | Desurvire et al. | 330/403 |
| 5,026,137 | 6/1991 | Tokumitsu | 350/96.16 |
| 5,099,319 | 3/1992 | Esch et al. | 358/86 |
| 5,107,360 | 4/1992 | Huber | 359/124 |
| 5,115,338 | 5/1992 | DiGiovanni et al. | 359/337 |
| 5,119,447 | 6/1992 | Trisno | 385/3 |
| 5,133,079 | 7/1992 | Ballantyne et al. | 455/4.1 |
| 5,134,620 | 7/1992 | Huber | 372/6 |
| 5,140,456 | 8/1992 | Huber | 359/341 |
| 5,142,532 | 8/1992 | Adams | 370/94 |
| 5,151,908 | 9/1992 | Huber | 372/6 |
| 5,153,762 | 10/1992 | Huber | 359/125 |
| 5,153,763 | 10/1992 | Pidgeon | 359/125 |
| 5,159,601 | 10/1992 | Huber | 372/6 |
| 5,166,821 | 11/1992 | Huber | 359/181 |
| 5,172,413 | 12/1992 | Bradley et al. | 380/20 |
| 5,173,794 | 12/1992 | Cheung et al. | 359/127 |
| 5,187,760 | 2/1993 | Huber | 385/37 |
| 5,191,586 | 3/1993 | Huber | 372/6 |
| 5,200,964 | 4/1993 | Huber | 372/26 |
| 5,208,819 | 5/1993 | Huber | 372/32 |
| 5,210,631 | 5/1993 | Huber | 359/132 |
| 5,210,633 | 5/1993 | Trisno | 359/194 |
| 5,222,089 | 6/1993 | Huber | 372/36 |

(List continued on next page.)

FOREIGN PATENT DOCUMENTS

WO8702531  4/1987  WIPO.

*Primary Examiner*—Leo Boudreau
*Assistant Examiner*—Bhavesh Mehta
*Attorney, Agent, or Firm*—William L. Feeney; Margaret A. Burke

[57] ABSTRACT

The present invention relates to optical amplifier systems which include optical add/drop multiplexing capabilities. The optical amplifier system includes a first optical circulator with at least three circulator ports. An optical transmission fiber optically communicates with the first circulator port for transporting a wavelength division multiplexed (WDM) optical transmission signal. A section of optically amplifying rare-earth doped fiber amplifies the WDM optical transmission signal input to the first circulator port. A wavelength-selecting optical fiber including at least one in-fiber Bragg grating for selectively reflecting an optical signal of a particular wavelength from the WDM optical signal optically communicates with the second circulator port. The optical amplifier system further includes a second optical circulator with at least three optical circulator ports, one of which communicates with the wavelength-selecting optical fiber. Another of the optical ports optically communicates with an optical fiber transmitting optical signals to be added to the WDM optical transmission signal.

9 Claims, 9 Drawing Sheets

U.S. PATENT DOCUMENTS

| | | | |
|---|---|---|---|
| 5,231,529 | 7/1993 | Kaede | 359/124 |
| 5,243,609 | 9/1993 | Huber | 372/19 |
| 5,257,124 | 10/1993 | Glaab et al. | 339/124 |
| 5,257,125 | 10/1993 | Maeda | 359/196 |
| 5,260,823 | 11/1993 | Payne et al. | 359/341 |
| 5,268,910 | 12/1993 | Huber | 372/6 |
| 5,271,024 | 12/1993 | Huber | 359/130 |
| 5,276,543 | 1/1994 | Olshansky | 359/124 |
| 5,283,686 | 2/1994 | Huber | 359/337 |
| 5,303,229 | 4/1994 | Withers et al. | 370/58.1 |
| 5,303,314 | 4/1994 | Duling, III et al. | 385/11 |
| 5,311,606 | 5/1994 | Asakura et al. | 385/33 |
| 5,325,459 | 6/1994 | Schmidt | 385/140 |
| 5,337,382 | 8/1994 | Mizrahi | 385/37 |
| 5,339,315 | 8/1994 | Maeda et al. | 370/85.1 |
| 5,351,317 | 9/1994 | Weber | 385/3 |
| 5,357,276 | 10/1994 | Banker et al. | 34/817 |
| 5,361,157 | 11/1994 | Ishikawa et al. | 359/168 |
| 5,410,624 | 4/1995 | Morkel | 385/24 |
| 5,434,702 | 7/1995 | Byron | 359/341 |
| 5,457,760 | 10/1995 | Mizrahi | 359/130 |

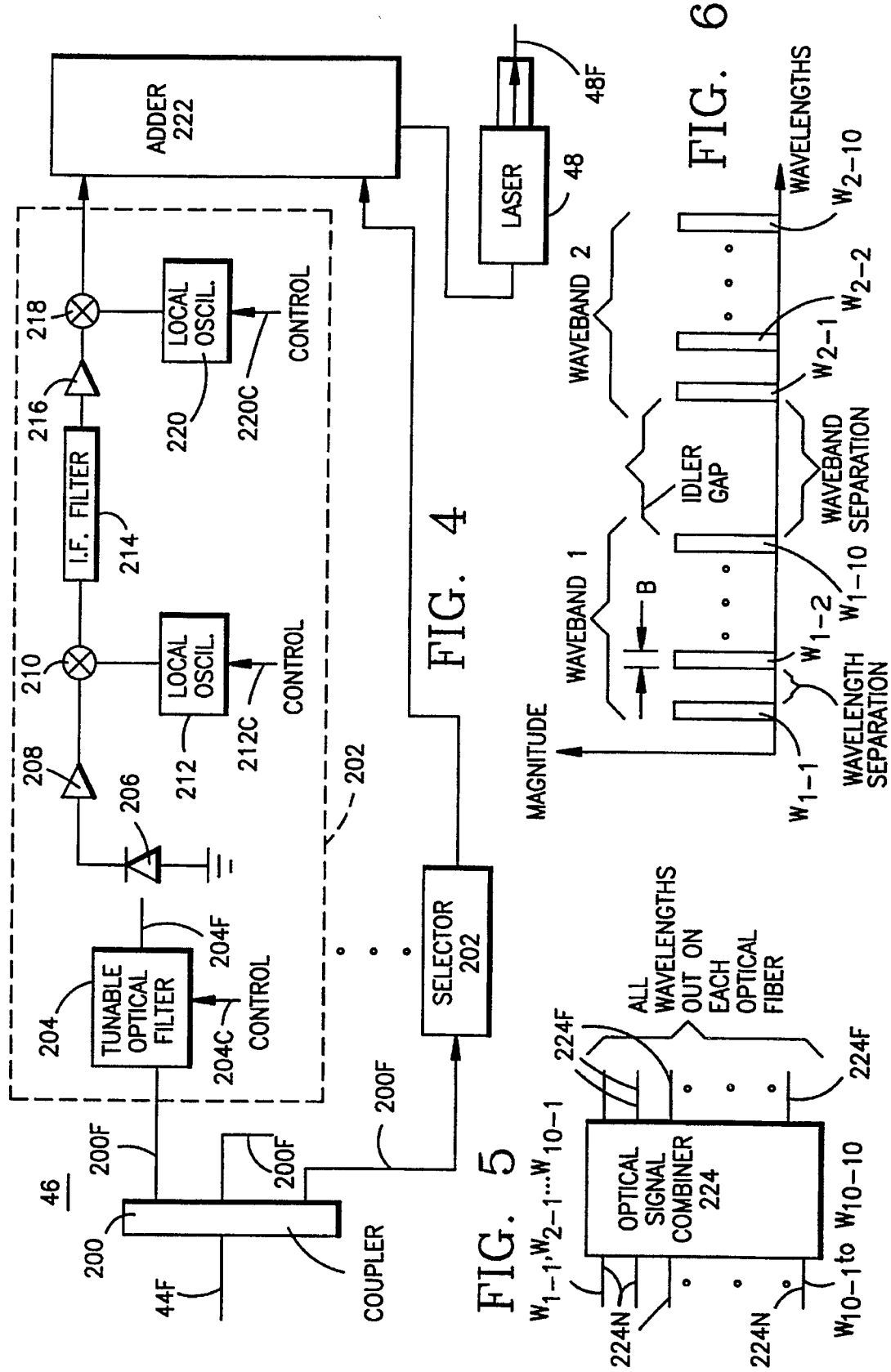

OPTICAL AMPLIFIER SYSTEMS WITH ADD/DROP MULTIPLEXING

CROSS-REFERENCE TO RELATED APPLICATIONS

This is a continuation-in-part of the present inventor's U.S. patent application Ser. No. 08/367,432, U.S. Pat. No. 5,557,442, filed Dec. 30, 1994. That parent application in turn was a divisional of the present inventor's grandparent U.S. patent application Ser. No. 08/071,263, U.S. Pat. No. 5,579,143, filed Jun. 4, 1993. Other divisionals of that application are U.S. patent application Ser. Nos. 08/366,472 and 08/366,889, U.S. Pat. No. 5,467,212, both filed Dec. 30, 1994. All four of those applications are incorporated by reference together with any amendments filed in those applications filed prior to the filing of the present application.

BACKGROUND OF THE INVENTION

The present invention relates to optical amplifier arrangements and, more specifically, such amplifiers constructed for use in telecommunications systems and/or cable TV systems using broad bandwidths.

Various telecommunications systems have been developed using optical fibers and having a relatively broad bandwidth. Such optical systems have higher channel capacity than wire telecommunications systems. However, the demand for communications channels to carry telephone signals including telephone calls (voice), facsimile, data (such as electronic mail or e-mail), and even video phone calls is growing at a tremendous rate. Some communications systems are envisioned which carry the above telecommunications signals together with cable television signals. The bandwidth of communications systems has limited the channel capacity because such systems often use components with limited bandwidth, introduce noise such as spontaneous emission, and/or are limited to one direction communication (for example, such systems may use amplifiers which can convey and/or amplify signals in only one direction, thus lacking bidirectionality).

Apart from limitations on the channel capacity of communications systems carrying telephone signals and/or cable TV signals, various other problems and constraints are generally present in such communications systems.

A problem with various optical communications systems is a difficulty in providing adequate filtering which will filter out undesired optical signals with a high degree of rejection, while passing a desired optical signal. If one is to use an optical fiber for carrying video or other signals on different wavelengths of laser light, one must have a tuneable optical filter (difficult to achieve satisfactorily) in order to select the wavelength of laser light corresponding to the desired signal or one must have a plurality of dedicated optical filters (each optical filter dedicated to a single wavelength) and an arrangement for selecting from the outputs of the different dedicated optical filters. In either case, complexity, high cost, and other difficulties have generally been encountered.

Communications systems often provide arrangements whereby one can block transmission of a signal such that a local signal can be inserted. For example, if a nationwide cable channel is provided to various local cable TV systems, such local cable TV systems want to be able to insert local commercials. At designated times in the feed from the nationwide cable channel, blocks of time will be provided for the local cable TV company to insert a local commercial. Arrangements for removal and insertion of signals upon a channel are often quite complex and expensive. Such techniques for dropping/inserting signals may require optical filters and thus be subject to the problems noted above with respect to optical filters.

A further problem with various systems is that failure of a single component in a system may cause the system to fail completely. This may result is loss of confidence in the communications system (telephone, cable tv, or both) and cause the provider to loose its customers.

Some components, even components in amplifier systems, in such communications systems may disadvantageously introduce insertion loss.

U.S. Pat. No. 5,283,686, issued Feb. 1, 1994 in the name of the present inventor, entitled OPTICAL SYSTEMS WITH GRATING REFLECTOR, and hereby incorporated by reference discloses amplifier arrangements which avoid or greatly reduce problems with spontaneous emission.

OBJECTS AND SUMMARY OF THE INVENTION

Accordingly, it is a primary object of the present invention to provide a new and improved optical amplifier suitable for use in an optical telecommunications system, an optical cable TV system, and/or combined optical telecommunications and TV system.

A more specific object of the present invention is to provide amplifiers with improved response curves and associated wider bandwidths for increased channel (telecommunications, TV, and/or combined) capacity.

A further object of the present invention is to provide for a bidirectional amplifier system.

A still further object of the present invention is to provide an improved tuneable optical filter.

Yet another object of the present invention is to provide for removal and insertion of local commercials or similar local signals in a highly efficient and relatively low cost fashion.

A still further object of the present invention is to provide an amplifier arrangement and communications system based thereon which reduces the risk that a single component failure will cause loss of cable services for customers.

A still further object of the present invention is to provide a communications system and components therefor which provide minimal interference from one channel to another.

More generally, the present invention is designed to minimize or avoid the problems discussed in the background portion of this application.

The above and other objects of the present invention which will be become more apparent as the description proceeds are realized by an optical amplifier system including opposite side first and second input/output optical fibers, each carrying optical signals in two directions. First and second directional couplers are provided, each having an input port respectively connected to the corresponding first and second input/output optical fiber, an amplifier supply port, and an amplified signal port. A first optical path carries and amplifies signals between the amplifier supply port of the first directional coupler and the amplified signal port of the second direction coupler, the first optical path having a first amplifier device thereon. A second optical path carries and amplifies signals between the amplifier supply port of the second directional coupler and the amplified signal port of the first direction coupler, the second optical path having a second amplifier device thereon. A first response equalizer is operably connected to the first amplifier device for flattening a response curve to compensate for non-linearities introduced by the first amplifier device. The first response equalizer has a plurality of in-fiber gratings with an amplitude adjustor between adjacent pairs thereof. A second response equalizer is operably connected to the second amplifier device for flattening a response curve to compensate for non-linearities introduced by the second amplifier device. The second response equalizer has a plurality of in-fiber gratings with an amplitude adjustor between adjacent pairs thereof. The input port of the second directional coupler is connected to supply amplified signals amplified by the first amplifier device and flattened by the first response equalizer. The input port of the first directional coupler is connected to supply amplified signals amplified by the second amplifier device and flattened by the second response equalizer.

The first response equalizer is connected to an equalizer port of the second directional coupler and the second response equalizer is connected to an equalizer port of the first directional coupler. Alternately, the first response equalizer is connected between the amplifier supply port of the first directional coupler and the amplified signal port of the second directional coupler and the second response equalizer is connected between the amplifier supply port of the second directional coupler and the amplified signal port of the first directional coupler. The first and second amplifier devices each includes two Erbium fibers separated by a separation directional coupler. In one embodiment, each of the amplitude adjustors is a length of Erbium fiber.

Each of the first and second amplifier devices includes two laser pumps and is operable to continue amplification even when one of the two laser pumps in the corresponding amplifier device fails.

Each of the in-fiber gratings has a corresponding control to tune it to selectively reflect or allow passage of a corresponding wavelength.

The present invention may alternately be described as an optical amplifier system including: an optical input fiber; an optical amplifier device connected to receive optical input signals from the optical input fiber; a directional optical transfer device having a first port connected to receive an initial amplified output from the optical amplifier device; an amplitude adjustment optical fiber connected to a second port of the optical transfer device, the second port receiving the initial amplified output applied to the first port, the amplitude adjustment optical fiber having a plurality of in-fiber gratings and a plurality of amplitude adjustors, each of the amplitude adjustors disposed between two of the in-fiber gratings, each of the in-fiber gratings reflecting a different wavelength of optical energy, the amplitude adjustment optical fiber supplying an adjusted amplified output to the second port; and an optical output fiber connected to a third port of the directional optical transfer device and operable to receive the adjusted amplified output.

Each of the amplitude adjustors is a length of Erbium fiber.

The initial amplified output is a non-linear amplification of the optical input signals. The amplitude adjustment optical fiber compensates for non-linearity in the optical amplifier device such that the adjusted amplified output is a relatively linear amplification of the optical input signals.

The present invention may alternately be described as an optical amplifier system including: an optical input fiber; a first optical amplifier device connected to receive optical input signals from the optical input fiber and provide an initial amplified output; an amplitude adjustment optical fiber operably connected to the first optical amplifier device to receive the initial amplified output, the amplitude adjustment optical fiber having a plurality of in-fiber gratings and a plurality of amplitude adjustors, each of the amplitude adjustors disposed between two of the in-fiber gratings, each of the in-fiber gratings reflecting a different wavelength of optical energy, the amplitude adjustment optical fiber supplying a reflection which is an adjusted amplified output; and an optical output fiber operably connected to the amplitude adjustment optical fiber; and wherein the initial amplified output is a non-linear amplification of the optical input signals, and wherein the amplitude adjustment optical fiber at least partially compensates for non-linearity in the first optical amplifier device.

Each of the amplitude adjustors is a length of Erbium fiber. The optical amplifier system may further include a circulator having first, second, and third ports, and wherein the first optical amplifier device is connected to the amplitude adjustment optical fiber by way of the circulator. The amplitude adjustment optical fiber is connected to the optical output fiber by way of the circulator, the first optical amplifier device connected to supply the initial amplified output to the first port. The amplitude adjustment optical fiber is connected to the second port and the optical output fiber is connected to the third port.

A second optical amplifier device is operably connected to receive the adjusted amplified output and provide a twice amplified output, and wherein the amplitude adjustment optical fiber compensates for non-linearities in the second optical amplifier device such that the twice amplified output is a relatively linear amplification of the optical input signals. The optical amplifier system causes the second optical amplifier device to operate in saturation to avoid or minimize spontaneous emissions. Each of the first and second optical amplifier devices includes an Erbium fiber.

Each of the in-fiber gratings has a corresponding control to tune it to selectively reflect or allow passage of a corresponding wavelength. A wavelength adder is operably connected to the amplitude adjustment optical fiber for providing wavelength signals which are supplied to the output fiber by way of the amplitude adjustment optical fiber.

The first optical amplifier device includes two laser pumps and is operable to continue amplification even when one of the two laser pumps fails.

A second optical amplifier device is operably connected to receive the adjusted amplified output and provide a twice amplified output, and wherein the first optical amplifier device includes a first pumping laser and the second optical amplifier device includes a second pumping laser. The first optical amplifier device is operably connected to receive pumping energy from the second pumping laser so as to continue working upon failure of the first pumping laser. The second optical amplifier device is operably connected to receive pumping energy from the first pumping laser so as to continue working upon failure of the second pumping laser.

The present invention may alternately be described as an optical amplifier system including: an optical input fiber; a first optical amplifier device connected to receive optical input signals from the optical input fiber and provide an initial amplified output; a second optical amplifier device operably connected to receive signals which have previously passed through the first optical amplifier device and provide a twice amplified output; and an optical output fiber operably connected to the second optical amplifier device. The first optical amplifier device includes a first pumping laser and the second optical amplifier device includes a second pumping laser. At least one of the first and second optical amplifier devices is operably connected to receive pumping energy by way of a first pumping energy path from the pumping laser of the other of the first and second optical amplifier devices so as to continue working upon failure of the pumping laser of the at least one of the first and second optical amplifier devices.

The first optical amplifier device is operably connected to receive pumping energy from the second pumping laser so as to continue working upon failure of the first pumping laser, and the second optical amplifier device is operably connected to receive pumping energy from the first pumping laser so as to continue working upon failure of the second pumping laser.

A directional coupler separates the first and second optical amplifier devices and the first pumping energy path is through the directional coupler.

A directional coupler separates the first and second optical amplifier devices and the first pumping energy path is a bypass optical fiber carrying pumping energy which bypasses the directional coupler.

The optical amplifier system further includes: an amplitude adjustment optical fiber operably connected to at least one of the first and second optical amplifier devices, the amplitude adjustment optical fiber having a plurality of in-fiber gratings and a plurality of amplitude adjustors, each of the amplitude adjustors disposed between two of the in-fiber gratings, each of the in-fiber gratings reflecting a different wavelength of optical energy. The amplitude adjustment optical fiber at least partially compensates for non-linearity in the first and second optical amplifier devices such that signals on the output optical fiber are a relatively linear amplification of the optical input signals.

The present invention may alternately be described as an optical amplifier system including: an optical input fiber; a first optical amplifier device connected to receive optical input signals from the optical input fiber and provide an initial amplified output; a drop optical fiber operably connected to the first optical amplifier device to receive the initial amplified output, the drop optical fiber having a plurality of in-fiber gratings and each of the in-fiber gratings has a corresponding control to tune it to selectively reflect or allow passage of a corresponding wavelength, each of the in-fiber gratings selectively reflecting a different wavelength of optical energy or passing the wavelength for dropping of it; and an output optical fiber operably connected to the drop optical fiber; and wherein the output optical fiber provides an amplified output corresponding to the optical input signals less any signals corresponding to a dropped wavelength.

A wavelength adder is operably connected to the drop optical fiber for selectively providing added wavelength signals which are supplied to the output optical fiber by way of the drop optical fiber. Alternately, the wavelength adder is operably connected to the output optical fiber for selectively providing added wavelength signals. Any added wavelength signal has a same wavelength as a dropped wavelength.

The initial amplified output is a non-linear amplification of the optical input signals, and wherein the drop optical fiber at least partially compensates for non-linearity in the first optical amplifier device.

The drop optical fiber has a plurality of amplitude adjustors, each of the amplitude adjustors disposed between two of the in-fiber gratings, the drop optical fiber supplying a reflection which is an adjusted amplified output, the amplitude adjustors at least partially compensating for non-linearities in the first optical amplifier device. A second optical amplifier device is operably connected to receive the adjusted amplified output and provide a twice amplified output, and wherein the drop optical fiber compensates for non-linearities in the second optical amplifier device such that the twice amplified output is a relatively linear amplification of the optical input signals less any signals corresponding to a dropped wavelength and with any added wavelength signals.

BRIEF DESCRIPTION OF THE DRAWINGS

The above and other features of the present invention will be more readily understood when the following detailed description is considered in conjunction with the accompanying drawings wherein like characters represent like parts throughout the several views and in which:

FIG. 4 shows a first embodiment of a tuneable optical filter according to the present invention;

FIG. 5 shows a second embodiment tuneable optical filter according to the present invention;

FIG. 6 shows a remove/insert arrangement according to the present invention;

DETAILED DESCRIPTION

Before discussing the specifics of the present invention, it is noted that some of the discussion hereafter emphasizes cable TV usage, but the present invention is broadly applicable to communications systems having telecommunications, cable TV, and/or both types of signals. Moreover, FIGS. 1 to 9 herein correspond essentially and respectively to FIGS. 1, 5, 6, 9, 10, 13, 14, 25, and 26 and the same component numerals are used herein.

Figure 1:
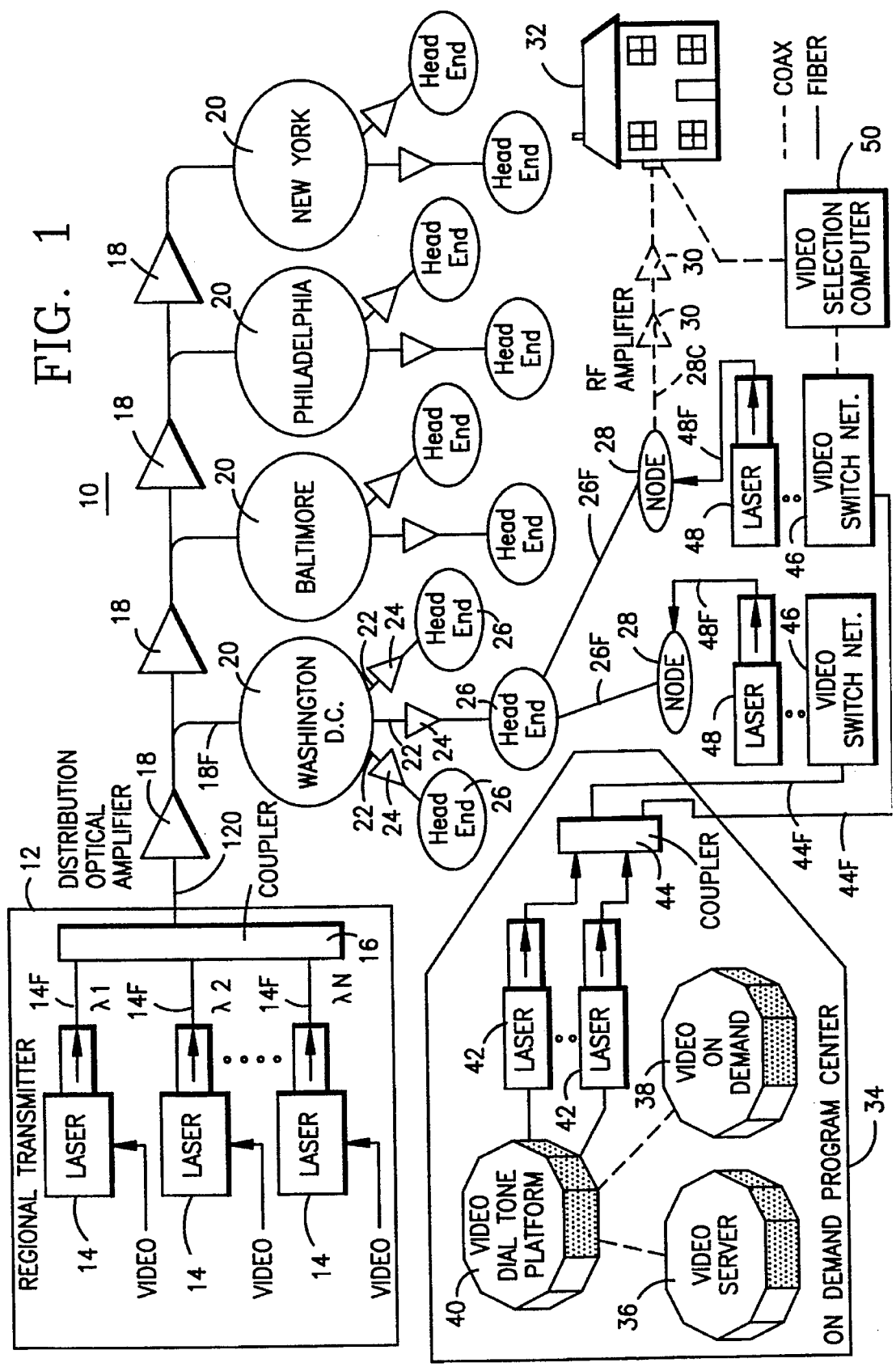
FIG. 1 shows a communications system according to the present invention.

Turning now to FIG. 1, a simplified block diagram shows an optical cable TV system 10 according to the present invention. A regional transmitter 12 uses lasers 14, only three of which are shown for simplicity, and optical coupler 16 to provide various video signals or channels on output optical fiber 12U. The coupler 16 simply uses known technology to combine the N different wavelengths corresponding to the N different lasers 14, the laser energy being supplied to coupler 16 on optical fibers 14F. As will be discussed in more detail below, each of the video inputs indicated for the lasers 14 may carry signals corresponding to a relatively large number, such as 3,000 different video signals or channels. The output from the regional transmitter or hub 12 is fed along optical fiber 12U to pass sequentially through distribution optical amplifiers 18 having various optical fibers extending therebetween and having optical signal splitters (not separately shown) separating out from the optical fibers between the various amplifiers 18 in order to go to the various metropolitan hubs 20 corresponding to different metropolitan areas. The optical signals received on the optical fiber by each metropolitan hub is sent, still in optical form, along various optical fibers 22 to optical amplifiers 24 and on to head ends 26. For ease of illustration, only some of the optical fibers 22, amplifiers 24, and head ends 26 are labeled. The head end 26 splits the optical signals for feeding along a plurality of optical fibers 26F to a plurality of neighborhood nodes 28. For ease of illustration, only two of the optical fibers 26F are shown and only two nodes 28 are shown. However, it will be understood that significantly more than two of the optical fibers 26F extend to corresponding significant numbers of nodes 28 from each of the head ends 26. Each of the head ends 26 would have a plurality of the nodes 28 connected to it, each node corresponding to a particular neighborhood with, for example, between 500 and 2,000 subscribers. The node 28 converts the optical signals on optical fiber 26F to electrical form for coax distribution. As shown just to the right of the right-most node 28 in FIG. 1, the resulting radio frequency signals are fed along coax 28C to RF amplifiers 30 to a subscriber's home 32. Although the signal is shown passing through two RF amplifiers 30 before reaching the subscriber's house 32, other houses (not shown) connected to the same node 28 may have signals which pass to the houses without passing through the two amplifiers. Advantageously, the use of separate optical fibers 26F connecting each node 28 to the corresponding head end 26 avoids the need for a plurality of distribution amplifiers in that portion of the path. Thus, none of the nodes 28 are further out on the distribution chain from head end 26 than any of the other nodes 28 and customers at any of the nodes 28 should have a picture of substantially the same clarity.

An on demand program center 34 may also be used to supply on demand or pay per view type programming to the various nodes 28. The on demand program center 34 includes a video server 36, video on demand block 38, and video dial tone platform 40, all of which may work in known fashion using known components except that they may incorporate certain highly advantageous features which are discussed in more detail in the parent application.

Video signals from the video dial tone platform 40 are supplied to lasers 42, only two of which are shown. The outputs of the lasers 42 are fed to a coupler 44 having various output optical fibers 44F, only two of which are shown. Each of the output optical fibers 44F carries all of the signals entering the summer 44 through the different optical fibers from the lasers 42. Each of the optical fibers 44F proceeds towards a corresponding node 28 by way of several intermediate components. In particular, each of the optical fibers 44F goes to a video switch network 46. The details of the video switch network 46 will be discussed below. Each of the optical fibers 44F carry all of a very large number of signals. The video switch network selects a significantly smaller number of the signals to proceed by coax to modulate laser 48. The video switch network 46 has converted the video signals from their optical form on optical fibers 44F such that coax is used to provide the same signals to lasers 48. The lasers 48 then supply the selected video signals, in optical form, to node 28. Although the video switch networks 46 and lasers 48 might be located at the node 28, it is more preferable to have them located at the same physical location as the head end 26. Although the arrangement of FIG. 1 shows the optical fibers 44F proceeding directly from summer 44 to the video switch networks 46, one could alternately feed the output of summer 44 through a distribution chain similar to the distribution chain of amplifiers 18 and hubs 20 shown with respect to the output of summer 16. Additionally, if desired, the outputs of lasers 42 could be supplied to the summer or signal combiner 16 for distribution along optical fiber 12U and the distribution chain downstream thereof. In that case, the various head ends 26 might have some arrangement to separate out the on demand signals so that only the signals requested by subscribers within a particular neighborhood node 28 would be sent to that neighborhood node 28.

Regardless of the various possibilities for distributing the video signals from program center 34 discussed above, a key feature is that the on demand or pay per view programming is not supplied to the subscriber's house 32 unless someone in his neighborhood has requested the particular on demand or pay per view video signal. In other words, the video switch network 46 only supplies programs to a particular node 28 if someone within that node has indicated a request for the particular on demand or paid per view program. Since other subscribers within a particular neighborhood corresponding to node 28 will not be certain which program is on which frequency and which program has been ordered, the motivation for piracy will be greatly reduced. A subscriber in a particular house 32 is significantly less likely to try to pirate a video signal if he simply does not know what will be on the signal. Therefore, relatively well known and inexpensive blocking arrangements (not shown) can be used to block the pay per view or on demand programming from reaching customers within the neighborhood corresponding to node 28 when their neighbor within that node has selected a particular program. A video selection computer 50 is used to control the video switch network 46 and is connected by coax to the subscriber's home 32 and the video switch network 46. Preferably, there would be one video selection computer 50 for each of the video switch networks 46 (although only one selection computer 50 is shown) and the selection computer 50 would be connected to all subscriber's homes in a particular neighborhood corresponding to the node 28. When the subscriber in home 32 wishes to view a particular program, the video selection computer is signalled by the subscriber using a key pad or other input means (not shown). The selection computer 50 then causes the corresponding video switch network 46 to pass the appropriate video signals through to the corresponding laser 48.

Figure 2:
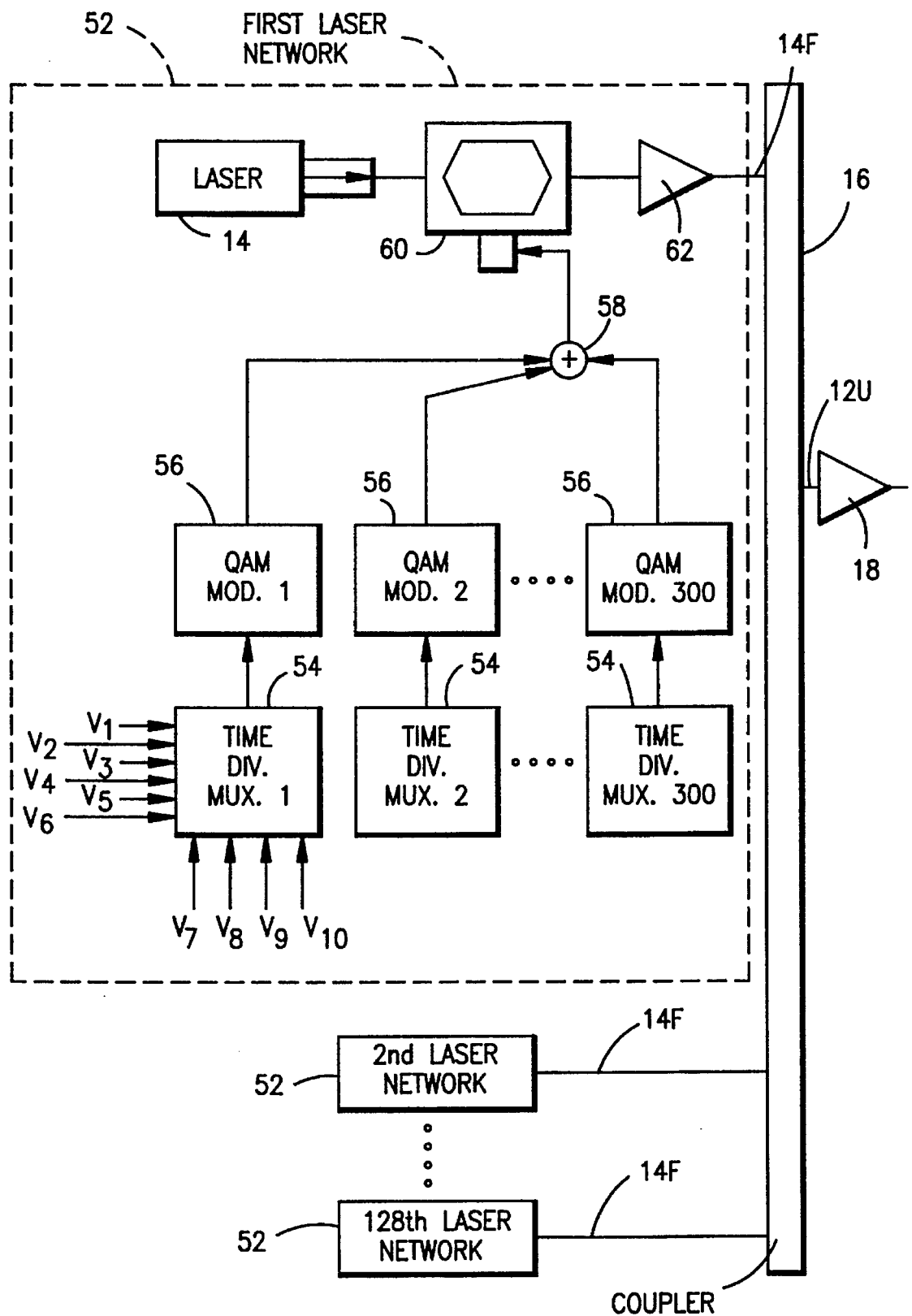
FIG. 2 shows a combiner which may be used in a system according to the present invention.
Figure 3:
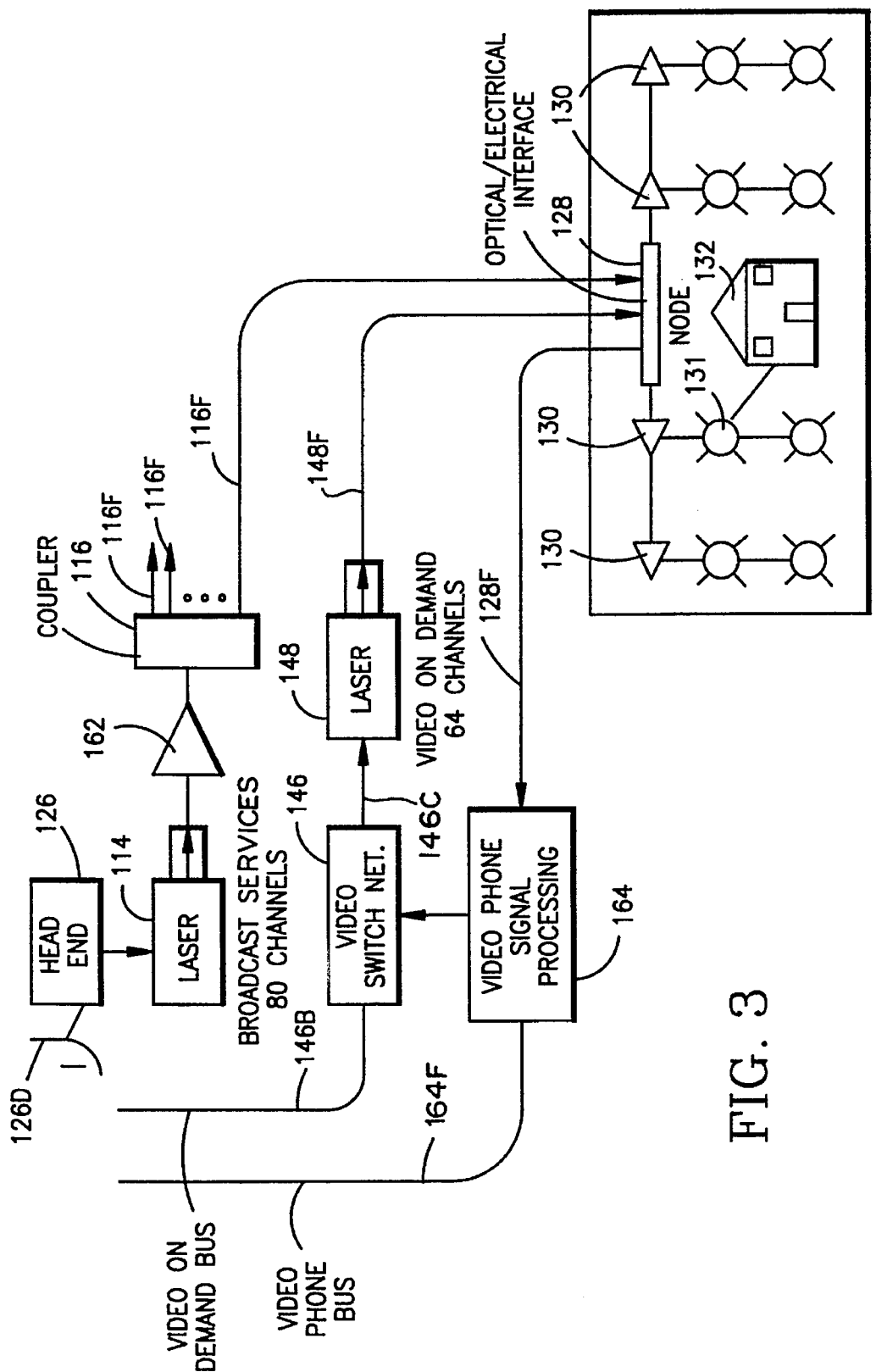
FIG. 3 shows various optical wavelengths and is used for explaining the operation of FIG. 2.

With reference now to FIGS. 2 and 3, a signal combiner arrangement is shown, which arrangement is a minor variation for parts of an arrangement of FIG. 4 of the parent application and which need not be discussed. The signals coming in on optical fiber 44F of FIG. 2 may include 128 different wavelengths. However, for the discussion which follows, it will be assumed that only 100 different wavelengths are used. If 100 wavelengths are used on a single optical fiber such as 44F of FIG. 2, certain distortions may occur in the signal quality depending upon the closeness of the wavelengths and the length of the optical fiber. The arrangement of FIG. 2 uses a plurality of input optical fibers 224N to supply an optical signal combiner 224 having output optical fibers 224F. The output optical fibers 224F will carry all of the wavelengths on each optical fiber and the combiner 224 would be substituted in place of the coupler 200 of FIG. 4 of the parent application. Accordingly, the output optical fibers 224F may lead to selectors 202 similar to that shown in FIG. 4 of the parent application. The important difference between combiner 224 and coupler 200 of FIG. 4 of the parent application is that combiner 224 includes a plurality of input optical fibers 224N each of which only carries a portion of the total wavelengths. In particular, there would be 10 input optical fibers 224N, each of which would carry only 10 of the 100 wavelengths which would be used.

With reference to FIG. 3, the 100 wavelengths which are used could be thought of as 10 wavelengths in each of 10 different wavebands, two of the wavebands being illustrated in FIG. 3. Wave band one includes wavelength $W_{1-1}$, wavelength $W_{1-2}$, through wavelength $W_{1-10}$. It will be recognized that the notation indicates the waveband by the first digit in the subscript and the number of the wavelength within a particular waveband by the second digit within the subscript. Accordingly, waveband two includes wavelengths $W_{2-1}$ through $W_{2-10}$. With reference to the top input fiber 224N in FIG. 2, it will be seen that the top input fiber carries each of the first wavelengths within the 10 different wavebands. Since wavelength $W_{1-1}$ is separated in wavelength significantly from wavelength $W_{2-1}$, there is much less distortion by having such wavelengths travel on the same optical fiber than there would be if wavelengths $W_{1-1}$ and $W_{1-2}$ traveled along the same fiber. Accordingly, and as illustrated with respect to the lower most of the input optical fibers 224N, each of the 10 input optical fibers 224N includes only a single wavelength from each of the 10 wavebands. All of the first wavelengths within the wavebands travel on the top optical fiber, all of the second wavelengths within the 10 optical bands travel on the second input fiber 224N, etc. Although all of the wavelengths travel on each of the optical fibers 224F at the output of the combiner 224, the length of the optical fibers 224F is relatively short such that minimal distortion would be introduced by having immediately adjacent wavelengths traveling on the same optical fiber.

With reference momentarily back to FIG. 1, it should readily be appreciated that the technique illustrated and explained with respect to FIGS. 2 and 3 could be used anywhere in the system where a lengthy optical fiber is used. For example, instead of a single optical fiber 12U in FIG. 1, a plurality of optical fibers (not shown) could be used having wavelength distribution similar to that explained with respect to input optical fibers 224N of FIG. 2. Couplers could be used to combine the optical wavelengths or carriers at places in the system where relatively short optical fibers carrying all optical wavelengths are needed.

With reference now to FIG. 4, an arrangement for realizing a tuneable optical filter 204 of FIG. 3 of the parent application will be discussed. A tuneable Mach-Zehnder filter 300 provides coarse filtering. In particular, the filter 300 selects the waveband in which the desired channel is at. For example, assuming that the channel which is to be selected by selector 202 of FIG. 4 of the parent application is a channel or video signal within waveband two (FIG. 2), the filter 300 is adjusted to allow passage of wavelengths $W_{2-1}$, $W_{2-2}$, up through $W_{2-10}$. Those 10 wavelengths within waveband two are supplied on output fiber 300F to an optical circulator 302. As indicated by the arrow within the circulator 302, the 10 wavelengths supplied by optical fiber 300F to a first port 302F of circulator 302 pass out of port 302S to an optical fiber 304 having a series of in-fiber Bragg grating elements 306A through 306J. The in-fiber Bragg grating elements or components 306A through 306J are of the known type developed by Meltz and Morey. Such gratings 306A through 306J can achieve optical bandwidths of four GHz or less. As known, these Bragg gratings can be tuned by varying their temperature. The temperature tuning coefficient is 11 to 13 pm/degrees centigrade. By selecting the three dB optical bandwidth of the gratings to be four GHz and by setting the center reflection wavelength of the gratings on 0.35 nm centers (i.e., 1532 nm, 1532.35 nm, 1532.70 nm ... 1567 nm) at a nominal temperature of 20° C., a 45 GHz channel bandwidth established by the tuneable Mach-Zehnder filter 300 is divided into 10 channels. In particular, the temperature of the individual Bragg gratings 306A through 306J can be varied by plus or minus 16° C. Thus, 100 different wavelengths can be selected over 35 nm, which corresponds to the output bandwidth of the Erbium fiber amplifier used as an optical amplifier at various places within the system.

Each of the gratings 306A through 306J has a corresponding resistive heating element 308A through 308J. As with the gratings, only some of the resistive heating elements 308A through 308J are illustrated. Each of the resistive heating elements is connected to a control interface circuit 310 which simply converts a control signal on line 310N (which signal would be supplied by video selection computer 50 of FIG. 1). The control interface circuit 310 simply controls the resistive heating elements 308A through 308J corresponding to the optical wavelength which is desired. Assume that it is desired to select wavelength $W_{2-2}$, the filter 300 allows passage of all of the wavelengths within waveband two which proceed along optical fiber 304. The first grating 306A within optical 304 would have been used to select wavelengths within waveband one. Since the desired wavelength is not in waveband one (refer back to FIG. 3) and since the signals within waveband one have been filtered out by filter 300, grating 306A need not be tuned for selecting wavelength $W_{2-2}$. Alternately, control interface circuit 310 might control resistive heating element 308A such that grating 306A, which corresponds to waveband one, is tuned to a wavelength such as $W_{1-1}$ which will minimize any reflection from grating 306A for the small amount of energy in waveband one which passes through filter 300. In any case, grating 306B will be controlled in order to select wavelength $W_{2-2}$ from waveband two. (In similar fashion, grating 306C would correspond to the third waveband, grating 306J would correspond to the tenth waveband, with similar gratings located in between). By controlling the temperature of grating 306B through resistive heating element 308B, the grating 306B is tuned to reflect wavelength $W_{2-2}$. The grating 306B operates in known fashion to reflect the desired wavelength and allow passage of wavelengths other than the desired wavelengths. Accordingly, wavelength $W_{2-2}$ is reflected back from grating 306B toward the second port 302S of circulator 302. Circulator 302 then supplies the selected wavelength $W_{2-2}$ at third port 302T of circulator 302 for passage along optical fiber 204F where it can be processed further in the manner described with respect to FIG. 4 above. (The circulator is a directional transfer device and a directional optical coupler might be substituted for it if isolators were also used.)

Turning now to FIG. 5, an alternate arrangement for the tuneable optical filter will be discussed. In the arrangement of FIG. 5, components are numbered in the "400" series with the same last two digits as the corresponding component in the FIG. 4 embodiment. Circulator 402 operates the same as circulator 302 of FIG. 4 and in-fiber Bragg gratings 406A through 406J operate as with the gratings 306A through 306J of FIG. 4 with an important difference to be discussed below. For ease of illustration, FIG. 5 does not include the resistive heating elements and control interface circuit used to control the various gratings, but it will be readily appreciated that an arrangement like that of FIG. 4 would be used.

The arrangement of FIG. 5 avoids the need for a coarse tuneable filter such as 300 of FIG. 4. Since there is no filter similar to filter 300 of FIG. 4, the arrangement of FIG. 5 uses an alternate technique for selecting the waveband. With reference to FIG. 3, the arrangement of FIG. 5 requires that the waveband separation as shown is larger-than the wavelength separation. In other words, the distance between wavelength $W_{1-10}$ and wavelength $W_{2-1}$ is significantly greater than the distance between, for example, wavelength $W_{1-1}$ and $W_{1-2}$. (For the technique of FIG. 4, the waveband separation might be equal to the wavelength separation.) For the arrangement of FIG. 5, the separation between the top wavelength in one waveband and the lowest wavelength in the next waveband provides what will be called an idler gap. The idler gap is at least as wide as the bandwidths B (only one labeled in FIG. 3) of the wavelengths summed with twice the wavelength separation. The manner in which the idler gap technique works is best illustrated by an example. Assume that wavelength $W_{2-2}$ is the wavelength which is to be selected. If the grating 406A was placed anywhere within waveband one, energy corresponding to its placement would be reflected back from grating 406A and would be applied by circulator 402 to optical fiber 204F. However, by tuning the grating 406A to the Center of the idler gap (using the same tuning technique discussed with respect to resistive heating element 308A of FIG. 4), all of the energy in waveband one will pass through grating 406A. Since there is no energy or signal at the wavelength corresponding to the idler gap, grating 406A will not reflect any wavelengths which are present. Grating 406B would be tuned to select the wavelength $W_{2-2}$ and would reflect that wavelength in the same fashion as discussed above. By providing an idler gap in between each pair of adjacent wavebands, the various gratings 406A through 406J can provide all of the optical tuning without requiring a filter such as filter 300 of FIG. 4. If one was selecting an optical wavelength within the third waveband (not shown in FIG. 3), each of gratings 406A and 406B would be tuned to their idler gaps such that they would reflect no wavelengths. In similar fashion if a wavelength within the tenth waveband corresponding to grating 406J was to be selected, each of the nine proceeding gratings would be tuned to an idler gap. Since each of the gratings must be able to tune to the idler gap, this may slightly reduce the number of wavelengths which can be used. For example, it might be that each of the wavebands would only accommodate nine wavelengths and the idler gap would effectively correspond to the tenth wavelength which had been dropped from the waveband. Since the present system provides such a high channel capacity, the slight reduction in channel capacity may be worthwhile to avoid the need for a filter like filter 300 of FIG. 4.

Figures 11, 12:
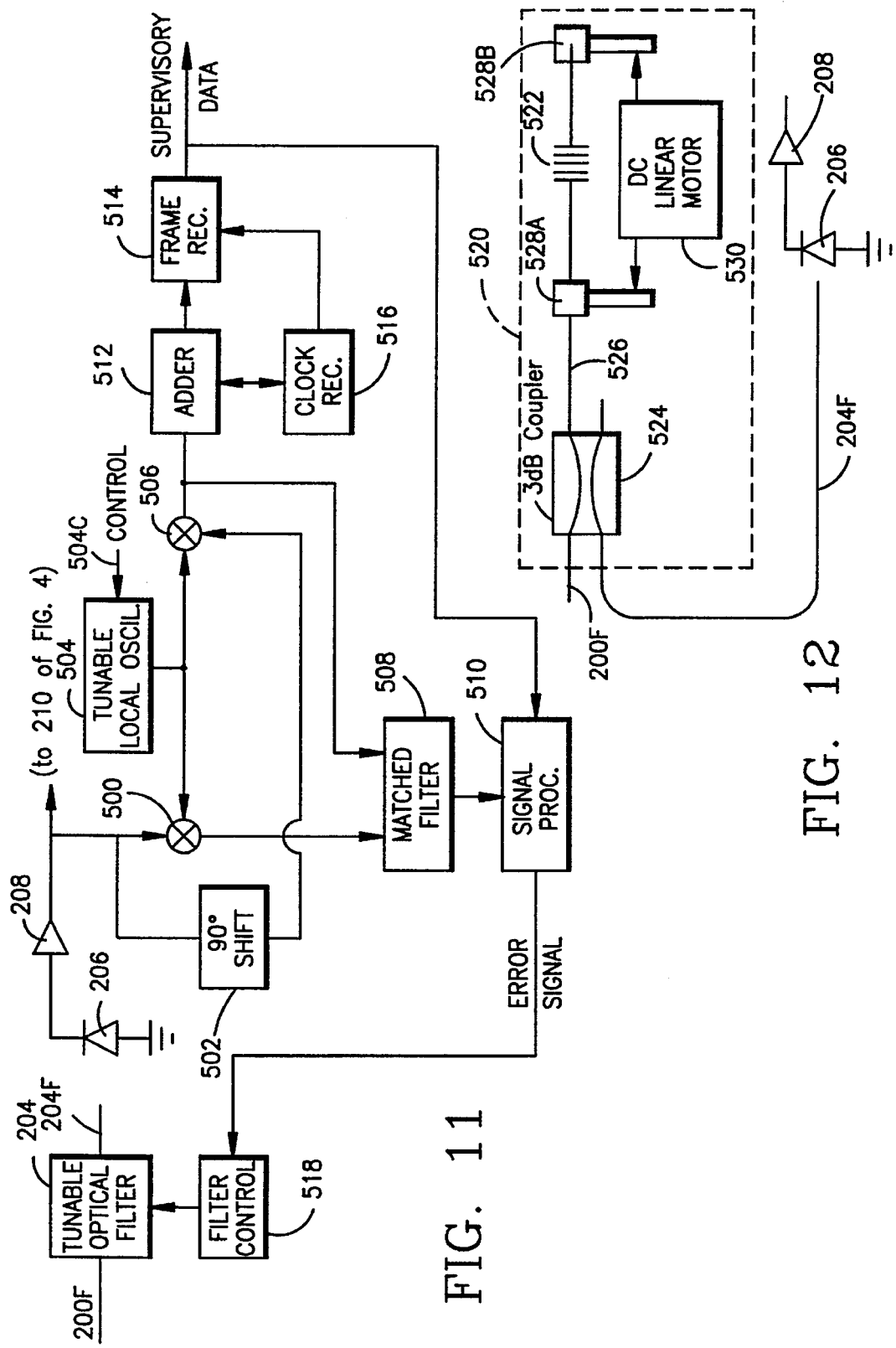
FIG. 11 is a block diagram of a third embodiment amplifier arrangement, having two stages, according to the present invention.
FIG. 12 is a block diagram of a third embodiment amplifier arrangement, having two stages, according to the present invention.

A feedback control circuit may be used with the tuneable optical filter 204 of the present invention as discussed relative to FIG. 11 of the parent application, but this need not be discussed in detail herein. Further, instead of temperature change tuning of the gratings, the various gratings may be tuned by changing their length as discussed relative to the stretching technique with respect to FIG. 12 of the parent application and/or compressing the gratings lengths.

Turning now to FIG. 6, an arrangement to drop certain channels and insert other channels is disclosed. In many proposed communications systems, it is desirable to re-utilize the optical carriers to aid system switching and to add and drop information as required. A method for accomplishing this goal is described by D. A. Smith in a paper entitled "Acousto-Optic Filters" presented at LEOS on Nov. 16–19, 1992. However, a superior technique for reuse of optical frequency carriers is shown with reference to FIG. 6.

As shown in FIG. 6, a remove/insert system 540 receives the optical carriers or wavelengths on an input optical fiber 540N from the transmission link and provides a continuation of the transmission link on output optical fiber 540U. The output fiber 540U will contain the same channels as the input fiber 540N except that, if desired, one or more of the optical carriers may be removed by system 540 and reinserted carrying different signals thereon. The signals which are added may be carried by the same optical frequency which is dropped and would be provided from an add channel optical fiber 540A.

Figure 7:
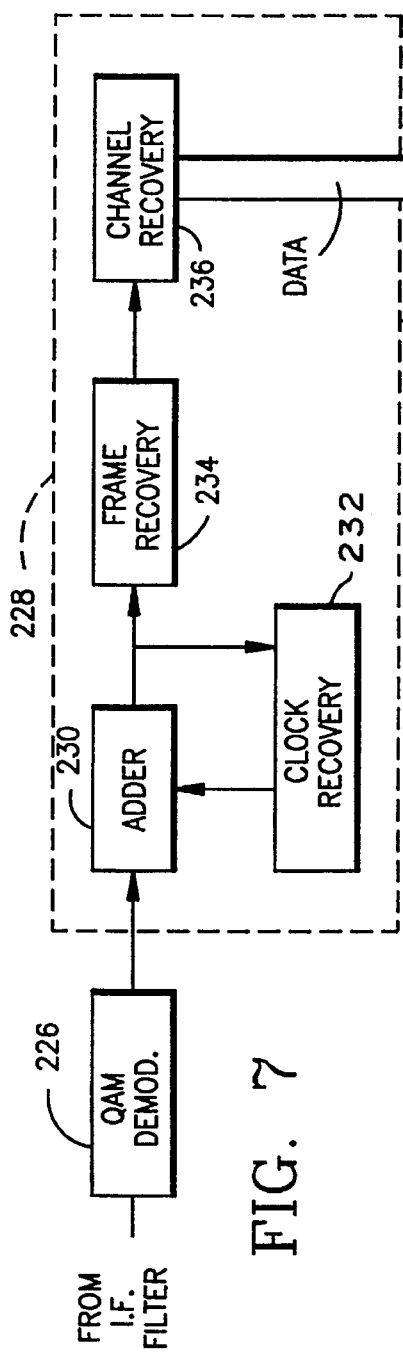
FIG. 7 is a wavelength diagram illustrating some of the principles of operation of the arrangement of FIG. 6.

The optical carriers on input optical fiber 540N pass through isolator 542 and into directional coupler 544. Those signals continue on optical fiber 546 having a series of in-fiber Bragg reflective gratings 548A, 548B, through 548J. For ease of discussion, it will be assumed that 10 optical carriers or wavelengths are provided and a corresponding 10 reflective gratings 548A through 548J would be used. The number of optical carriers and corresponding number of reflective gratings could be higher or lower. With reference to FIG. 7, the wavelengths $W_A$, $W_B$, through $W_J$ correspond respectively to wavelengths of the optical carriers coming in on input fiber 540N. Each of the gratings has an associated resistive heating element controlling or tuning its frequency in the same fashion as described in more detail above with respect to FIG. 4. For ease of illustration, only one of the resistive heating elements 550A is shown, but numerous such elements would be connected to a control 552 which would cause the reflectors such as 548A to either be tuned to a reflection state corresponding to wavelength $W_A$ or to a pass through state where grating 548A would reflect optical energy only at the A pass through location indicated on FIG. 7. Since there is no optical energy at the wavelength corresponding to the A pass through, all optical energy on optical fiber 546 would pass through grating 548A when the grating is in its pass through state. It will be appreciated that the pass through state is somewhat similar to placing the gratings in the idler gap state discussed above with respect to FIG. 5. At any rate, each of the gratings is set to either reflect a corresponding wavelength or allow passage of the corresponding wavelength. Assume, for example, that the wavelength $W_B$ corresponding to grating 548B is to be dropped from the transmission link, all of the gratings except 548B will be set or tuned to reflect their corresponding wavelengths. Grating 548B will be set to a pass through position such that the optical carrier at wavelength $W_B$ will appear on the drop channel end 554. All of the other optical wavelengths will be reflected back by the corresponding gratings and upon passage through the directional coupler 544, will be supplied on output optical fiber 540U. Thus, the optical carrier $W_B$ has been dropped.

In addition to dropping the optical carrier, the arrangement of FIG. 6 allows one to reinsert the same optical carrier with different video or data signals imposed thereon. In particular, carriers containing information which is to be reinserted are applied to add channel optical fiber 540A and pass through directional coupler 556 on to in-fiber Bragg gratings 558A through 558J corresponding respectively to the wavelengths $W_A$ through $W_J$ of FIG. 7 and identical in construction with corresponding respective gratings 548A through 548J. Taking again the example where wavelength $W_B$ has been removed and the same optical wavelength is to be reinserted carrying different video signals or other information, the control 552 would control the gratings 558A through 558J through various resistive heating elements (not shown, but same in operation as described in FIG. 9) such that all of the gratings 558A through 558J are in their pass through states except that 558B is tuned to wavelength $W_B$. Therefore, the optical carrier $W_B$ received on the add channel optical fiber 540A is reflected back through directional coupler 556 and passes through to optical fiber 560 and goes on to output optical fiber 540U by way of isolator 562 and coupler 544. (The isolator 562 simply prevents signals from going from coupler 544 to coupler 556.) Accordingly, the output optical fiber 540U will contain all of the optical carriers which were allowed to pass through together with an optical carrier which was dropped and then reinserted with alternate data, video signals, or other signals imposed thereon.

Although the discussion with respect to FIG. 6 illustrates temperature tuning of the in-fiber gratings, one could alternately tune those gratings by mechanical length changing by stretching and/or compressing as discussed above. Further, it should be noted that the arrangements of FIGS. 4 and 5 could be modified by tuning the gratings therein by mechanical length changing. In all cases, the in-fiber gratings may be constructed in known fashion. Such gratings may be commercially available types produced by United Technologies or the more recently available ATT phase plates.

Figure 8:
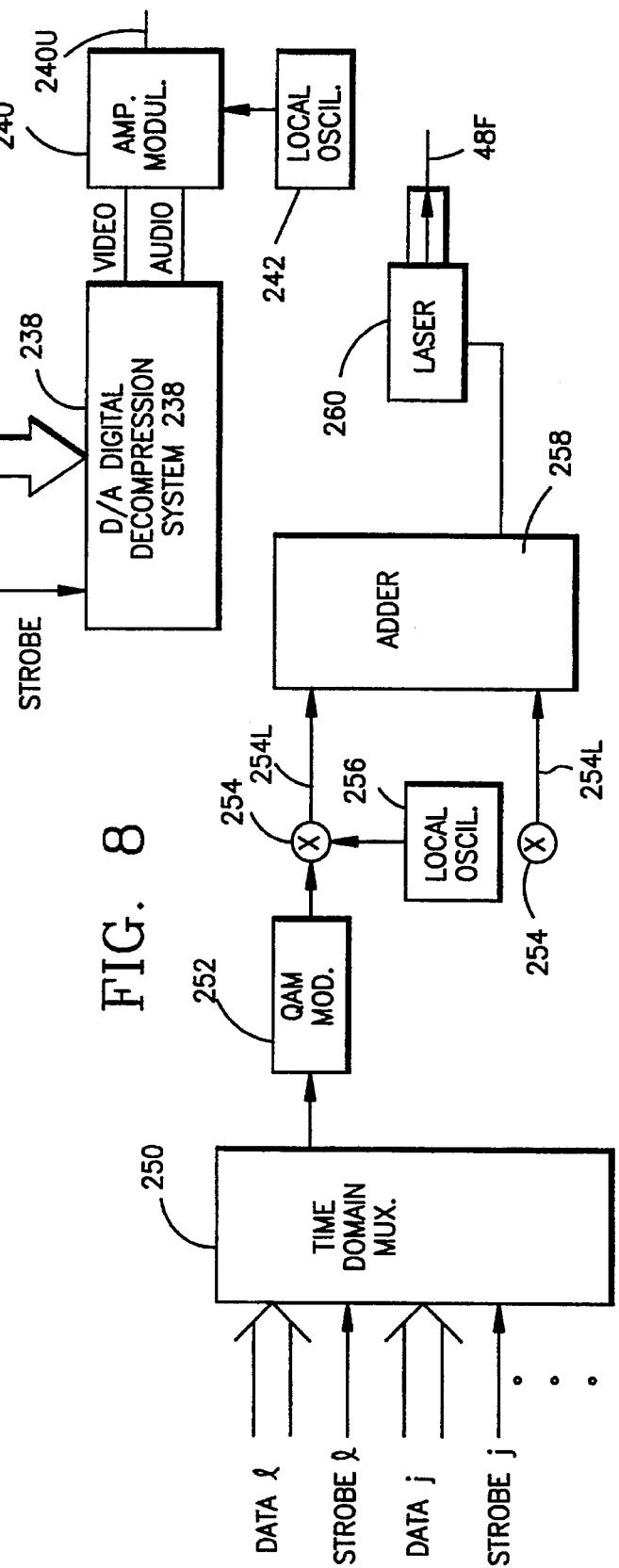
FIG. 8 is a block diagram of an amplifier arrangement according to the present invention.
Figure 9:
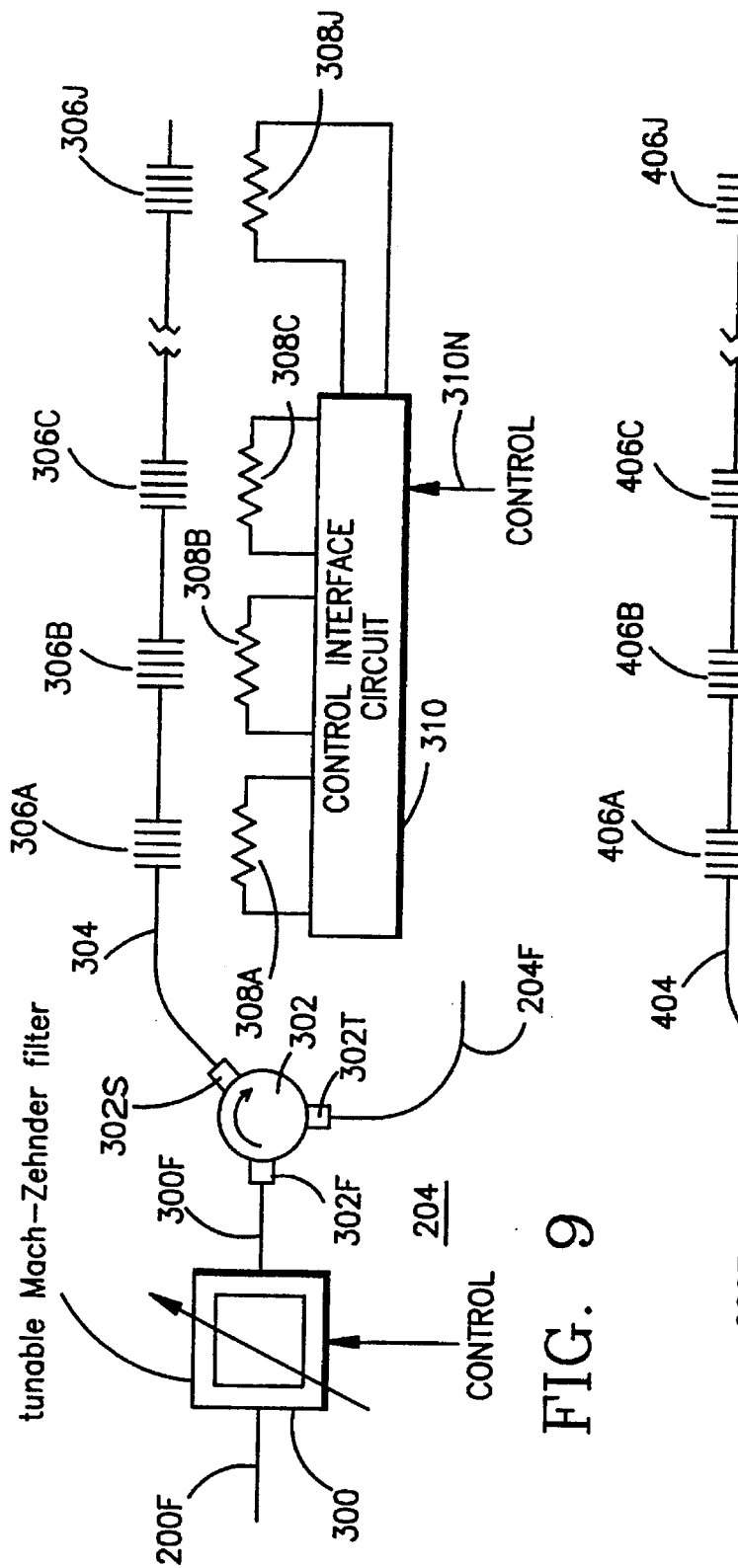
FIG. 9 is a gain chart demonstrating a principle of operation of the present invention.

Turning now to FIG. 8, an optical amplifier arrangement 940 is shown. A wave division multiplexor (WDM) 940M receives input from optical fiber 940N and laser pump energy from laser pump 940L. The output optical fiber 940F, including the laser energy from the pump laser and the optical signals received at the amplifier input 940N are supplied to an Erbium fiber 942 connected to a first port 944F of a circulator 944. The port 944F also supplies laser energy from pump laser 946 by way of a port 944R of circulator 944. The laser energy supplied by the pump lasers 940L and 946 excite the Erbium ions such that the optical signals received on input fiber 940N will be provided in amplified form out of port 944S of circulator 944. However, the gain of this optical amplifier may be nonuniform over wavelength as indicated by the gain curve of FIG. 9. In-fiber Bragg gratings 948, 948A, and optical attenuators 950B through 950J are used to filter out the laser energy inserted by the pump lasers 940L and 946 and are used to provide a relatively flat adjusted gain curve as shown in FIG. 9. In particular, the signals coming in on amplifier input 940N include ten different optical wavelengths as previously discussed. Therefore, 10 of the gratings 948A through 948J would be included, one for each of the wavelengths. The gratings would be used to reflect the optical energy at the corresponding wavelength. The gratings 948A through 948J could be tuneable in the same fashion as the gratings discussed above, although the gratings would preferably simply be maintained at a sufficiently stable temperature that they would maintain their reflective characteristics for the corresponding wavelength.

As shown on the small portion of the gain curve illustrated in FIG. 9, the wavelength corresponding to point A has the lowest gain from the optical amplifier. Therefore, optical energy at that wavelength is reflected back to port 944S of circulator 944 without any attenuation. Since the wavelength corresponding to point B of FIG. 9, which also corresponds to grating 948B, has a higher gain than the wavelength corresponding to point A, an adjustable attenuator 950B attenuates the optical energy at the wavelength corresponding to point B. Considering that optical energy passes through attenuator 950B twice, bringing the gain down from point B to point B' in FIG. 9 requires that attenuator 950B provide one half of the attenuation required to move from point B to point B' in FIG. 9.

Optical energy at the wavelength corresponding to point C of FIG. 9 may be adjusted down to the flat response curve or adjusted gain of FIG. 9 at point C' by having attenuator 950C provide an attenuation equal to one half of the difference in gain between point B and point C. By using the same technique at the different wavelengths, one can provide an adjusted gain curve which is relatively flat. The various reflected optical wavelengths or carriers enter the circulator at 944, whereas the laser energy from pump lasers 940L and 946 would be at different wavelengths and not reflected back to that port. The optical energy entering at 944S is supplied by circulator 944 to a port 944T and provides the output at optical fiber 952. Optionally, a coupler 954 supplies the output to an optical spectrum analyzer 956 which is connected to a microprocessor 958. The microprocessor in turn controls the adjustable optical attenuators 950B through 950J so as to provide a flat response curve corresponding to the adjusted gain illustrated in FIG. 9.

For the above arrangement, it is assumed that all of the gratings have the same reflectivity. The control of the optical attenuators can be accomplished using known techniques. In the specific aspect of the present invention, the optical attenuator 950B would first be adjusted until the gain at point B was the same as the gain at point A. This is done by making the attenuator 950B correspond to one half of the difference in gain between points A and B. The attenuator 950C is then adjusted until the gain at that wavelength corresponds to the gain at point A. This process may be repeated for all 10 (or some other number) of the optical carriers in such a wave division multiplexed optical system.

By providing the spectrum analyzer 956 and microprocessor 958, the gain of the amplifier (controlled by all those components numbered between 940N and 954) can be maintained by feedback control to provide a flat response curve.

The amplifier of FIG. 8 is an improvement of one disclosed and claimed in the present inventor's prior U.S. Pat. No. 5,283,686 issued Feb. 1, 1994, entitled "Optical System With Grating Reflector" and incorporated by reference above. That patent shows the laser pump connected to the input side of an erbium fiber by way of either a directional coupler or a WDM, whereas FIG. 25 of the parent application simply shows a laser pump at the input side of the erbium fiber. It would be understand therefrom and from the text-of the parent application that the pump laser would be connected by a directional coupler or WDM as shown in the '686 patent or in any other suitable fashion. The amplifier of FIG. 8, which is identical to FIG. 25 of the parent application except that the WDM is explicitly shown, may be used as optical amplifiers 18 and 62 of FIG. 2 of the parent application and at other places in the system.

An unshown modification of the FIG. 8 embodiment involves placing a second WDM with associated pump laser between the Erbium fiber 942 and port 944F in lieu of the pump laser 946. In that case, the circulator 944 would be a three port circulator without port 944R.

Figure 10:
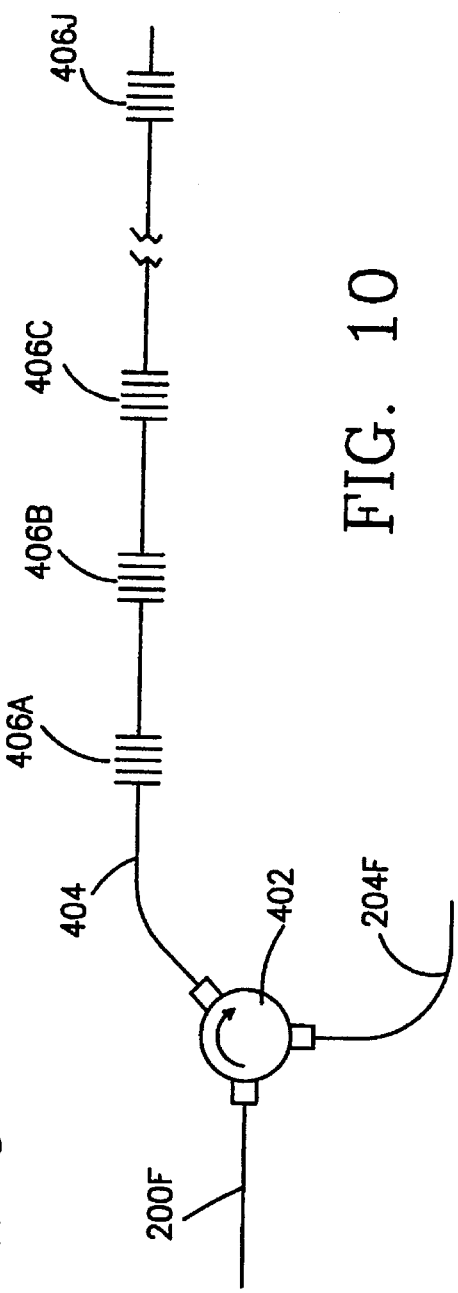
FIG. 10 is a block diagram of a second embodiment amplifier arrangement, having bidirectionality, according to the present invention.

With reference now to FIG. 10, a bidirectional amplifier system 1000 is shown for conveying and amplifying signals traveling in both directions on and between input/output optical fiber 1002 and input/output optical fiber 1004. An optical circulator 1006 at the left side of amplifier system has first, second, third, and fourth ports 1006F, 1006S, 1006T, and 1006R respectively. Signals entering port 1006F from fiber 1002 exit port 1006 for conveyance in an upper rightward path by optical fiber to WDM 1008, which is also receiving pump energy from pump laser 1010. The output of WDM 1008 is supplied to the upper Erbium fiber 1012 (between the Xs) which uses the co-propagating pump energy from laser 1010 to amplify the signals passing therethrough. The output of Erbium fiber 1012 goes to WDM 1014 where counter-propagating pump energy from pump laser 1016 is supplied for amplification in Erbium fiber 1012.

Although the system 1000 shows use of both co-propagating laser energy from pump 1010 and counter-propagating laser energy from pump 1016, one could alternately use only co-propagating energy or only counter-propagating energy. In that case the pump and WDM associated with the non-used type of propagation would of course be deleted.

The output of upper Erbium fiber 1012 is supplied via WDM 1014 and an optical fiber to the third port 1006T of a right side optical circulator 1006. The input to port 1006T passes out port 1006R to fiber 1018 having in-fiber gratings 1020 and variable attenuators 1022 between adjacent pairs of gratings 1020. Gratings 1020 and variable attenuators 1022 operate in the same fashion as the gratings and attenuators attached to port 944S of the FIG. 8. As with the FIG. 8 arrangement, the attenuators 1022 could be feedback controlled by use of an optical spectrum analyzer (not shown) attached or coupled to fiber 1004 and a microprocessor. Alternately, the attenuators 1022 could be set for a flat response curve and left alone, this also being an option for the FIG. 8 embodiment. At any rate, fiber 1004, attached to a first port 1006F of the right side circulator 1006, is similar to fiber 952 of FIG. 8 with the difference noted below.

Unlike fiber 952, fiber 1004 carries optical signals in both directions. Those signals going on fiber 1004 in a leftward direction in the drawing enter port 1006F of the right side circulator 1006 and exit from its port 1006S. These signals exiting 1006S pass leftwardly through a lower optical fiber path having components 1008, 1010, 1012, 1014, and 1016 constructed, arranged, and operating the same way as the identically numbered components carrying rightwardly passing signals on the upper optical fiber path from left circulator 1006 to the right side circulator. The signals entering port 1006T of the left side circulator pass out its port 1006R to left side fiber 1018, gratings 1020 and attenuators 1022 which are constructed, arranged, and operating the same way as the identically numbered components on the right side.

If desired, a second optical spectrum analyzer (not shown) could analyze leftwardly traveling optical signals to control left side attenuators 1022 by way of the same or a different microprocessor used to control right side attenuators with the technique associated with components 956 and 958 of FIG. 8. Alternately, a single optical spectrum analyzer could be used in a multiplexed fashion to alternately test rightward signals on fiber 1004 and leftward signals on fiber 1002 and would be connected to a single microprocessor which alternately adjusted right and left side attenuators. A further alternative is to have the attenuators initially set for a flat response and simply leave them at their settings. Depending on the stability of the system and the flatness of response which is required, the attenuators could simply be left alone absent malfunction or could be periodically reset to maintain flat response.

In addition to providing a flat amplification curve, both fibers 1018 allow spontaneous emissions to exit from their ends remote from circulators 1006 in the same fashion as in the incorporated by reference U.S. Pat. No. 5,283,686.

Amplifier system 1100 of FIG. 11 is a single direction two stage amplifier having input optical fiber 1102 and output optical fiber 1104. WDM 1108, pump laser 1110, Erbium fiber 1112, in-fiber gratings 1120, and attenuators 1122 are constructed, arranged, and operable in the same fashion as the corresponding component (same last two digits) of FIG. 10 except as noted below. Circulator 1130 passes signals incoming on its first port 1130F to its second port 1130S for passage to fiber 1118 operable like fiber 1018 of FIG. 10. Signals reflected back into port 1130S pass out port 1130T to Erbium fiber 1132 and passage to WDM 1134 connected to pump laser 1136 providing counter-propagating pumping energy to Erbium fiber 1132. Further, the pump laser 1138 provides counter-propagating pumping energy to Erbium fiber 1112 by way of fourth port 1130R and first port 1130F.

The arrangement of FIG. 11 compensates for the insertion loss of the optical circulator 1130 by having Erbium fiber 1132 downstream from the circulator. Considering the first stage between laser 1110 and laser 1138 and the second stage between laser 1138 and laser 1136, this design would preferably have the second stage operated in deep saturation. This prevents or greatly minimizes any spontaneous emission which might otherwise be introduced in the second stage. A further difference with the FIG. 11 design is that the attenuators 1122 would be adjusted for a flat response out of fiber 1104. In other words, the attenuators compensate for the non-linearity of the first stage associated with Erbium fiber 1112 and compensate for the non-linearity of the second stage associated with Erbium fiber 1132. Accordingly, any optical spectrum analyzer (not shown) would be used at fiber 1104, not at the output of port 1130T. Laser pump 1138 is optional in this design.

FIG. 12 shows a one directional amplifier 1200 with input fiber 1202 and output fiber 1204. Amplifier 1200 has WDM 1208, laser pump 1210, Erbium fiber 1212, circulator 1230, in-fiber gratings 1220 and laser pump 1238 constructed, arranged, and operable identically to the corresponding component (same last two digits) of the FIG. 11 design except as noted below.

The FIG. 12 design uses a series of Erbium fibers 1240 in between adjacent pairs of gratings 1220 on fiber 1218, which fibers are provided pumping energy by laser pump 1242.

With reference momentarily back to FIG. 9, the arrangement of FIG. 12 relies on increasing the gain of points such as A and B up to the gain associated with level C, instead of decreasing the gain (attenuation) of the points B and C as the various attenuator arrangements do. Therefore, the wavelength order of gratings 1220 is reversed from the wavelength order of the gratings of FIG. 8 and the other designs using attenuators. In other words, the higher wavelength gratings 1220 would be closer to circulator 1230 than lower wavelength gratings. The various Erbium fibers 1240 would have lengths and other parameters to provide the desired amplification at different wavelengths so as to realize a flat response curve. If desired, the gain of the Erbium fibers 1240 would be feedback controlled to maintain a flat response curve for the amplifier. However, the Erbium fibers could alternately simply be established initially to provide a flat response curve depending on the stability of the gain and the required degree of flatness of the gain curve.

As a further alternative to the attenuator devices such as 1022 of FIG. 10 and the amplifying Erbium fibers 1240 of FIG. 12, the laser pump 1242 of FIG. 12 might be left out such that Erbium fibers 1240 act as attenuators for flattening (i.e., as used herein, flattening refers to flattening of a response curve relative to wavelength). Yet another alternative to provide amplitude adjustment for flattening purposes is that shown in the present inventor's prior U.S. Pat. No. 5,271,024 issued Dec. 14, 1993, entitled "Optical Fiber Amplifier and Laser with Flattened Gain Slope," and hereby incorporated by reference. In that patent, amplitude adjustment for flattening is provided by having at least some of the in-fiber gratings at a non-perpendicular angle with respect to a longitudinal axis of the amplitude adjustment optical fiber. Since this technique which involves blazed gratings may be used to provide attenuation for reflected energy or transmitted energy, it will be appreciated that use of such slanted gratings in fiber 1218 would allow an output fiber to be connected to the right side thereof (i.e., in place of laser pump 1242) if the system used attenuation of transmitted energy. It should therefore be appreciated that the optical fiber such as 1218 in FIG. 12 may, for this or any of the other embodiments discussed above or below, be realized by an amplitude adjustment optical fiber providing amplitude adjustment by one or more of the following selected from the group consisting of:

having at least some of the in-fiber gratings at a non-perpendicular angle with respect to a longitudinal axis of the amplitude adjustment optical fiber;

a length of Erbium fiber between two of the in-fiber gratings and adjusting amplitude by amplification; a length of Erbium fiber between two of the in-fiber gratings and adjusting amplitude by attenuation; and an attenuator device between two of the in-fiber gratings and adjusting amplitude by attenuation.

Figures 13, 14:
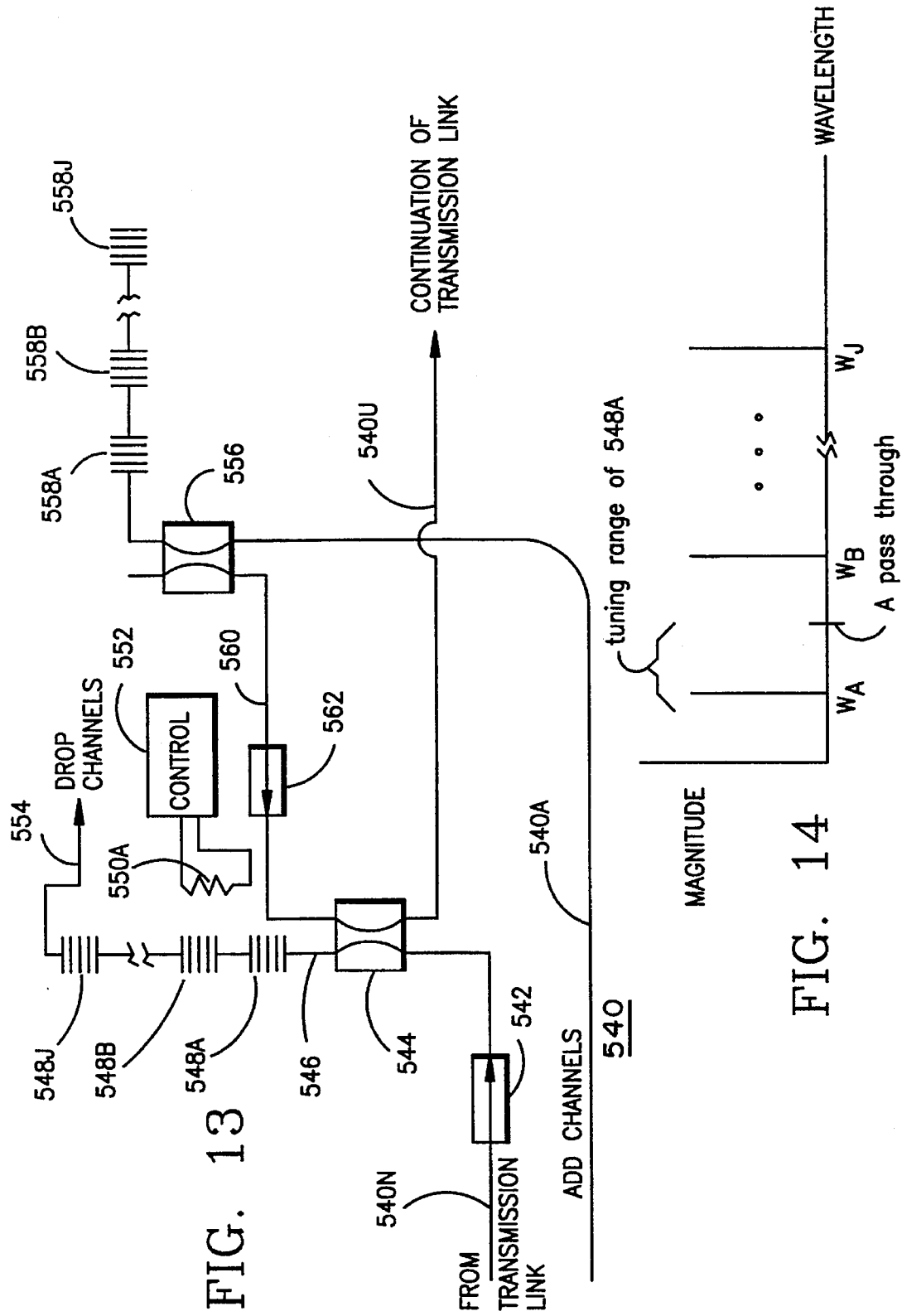
FIG. 13 is a block diagram of a fourth embodiment amplifier arrangement, with enhanced reliability, according to the present invention.
FIG. 14 is a block diagram of a fifth embodiment amplifier arrangement, with enhanced reliability, according to the present invention.

FIG. 13 shows an improved reliability amplifier 1300 having input fiber 1302, output fiber 1304, WDM 1308, laser pump 1310, Erbium fiber 1312, in-fiber gratings 1320, attenuators 1322, Erbium fiber 1332, WDM 1334, and laser pump 1336 constructed, arranged, and operable identically to the corresponding component (same last two digits) of the FIG. 11 design except as noted below. Amplifier 1300 uses an optical circulator 1250 having first, second, and third ports 1250F, 1250S, and 1250T with signals circulated clockwise. If laser pump 1310, which operates at 980 nm for example, fails, the Erbium fiber 1312 would normally attenuate the signal and the system would fail. However, laser pump 1336 provides laser energy (such as at 1480 nm) for pumping Erbium fiber 1332 and which will pump Erbium fiber 1312 by passage from port 1350T to port 1350F. Thus, the failure of pump 1310 may decrease signal strength, but will not cause failure of the overall communications system. If laser pump 1336 fails, associated Erbium fiber 1332 will still receive pumping energy from laser pump 1310 by way of WDM 1352, optical fiber 1354, and WDM 1356. Therefore, the failure of pump 1336 may decrease signal strength, but will not cause failure of the overall communications system. FIG. 14 shows an improved reliability amplifier 1400 having input fiber 1402, output fiber 1404, WDM 1408, laser pump 1410, Erbium fiber 1412, in-fiber gratings 1420, attenuators 1422, Erbium fiber 1432, WDM 1434, laser pump 1436, WDM 1452, optical fiber 1454, and WDM 1456 constructed, arranged, and operable identically to the corresponding component (same last two digits) of the FIG. 13 design except as noted below. The path associated with WDM 1452, optical fiber 1454, and WDM 1456 carries pumping energy to Erbium fiber 1432 such that failure of pump laser 1436 will not shut down the system. Circulator 1460 has first, second, third, and fourth ports 1460F, 1460S, 1460T, and 1460R with signals circulated clockwise except that port 1460T is isolated from port 1460R. WDM 1462 and optical fiber 1464 carry 1480 nm pumping energy from pump 1436 to port 1460R for passage out port 1460F and into Erbium fiber 1412 such that failure of laser pump 1410 will not shut down the system.

Figure 15:
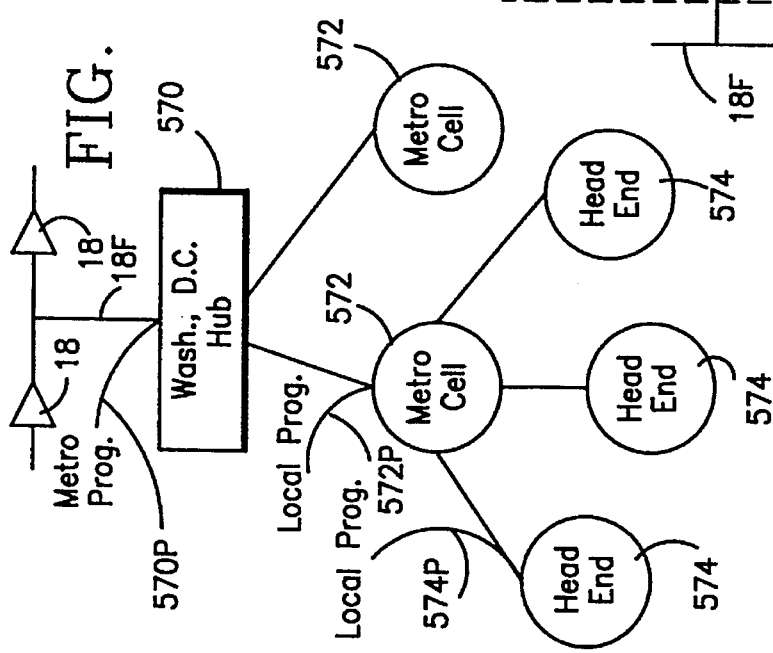
FIG. 15 is a block diagram of a sixth embodiment amplifier arrangement, with signal dropping/inserting capability, according to the present invention.

Amplifier 1500 of FIG. 15 has input fiber 1502 and output fiber 1504 and provides amplification features similar to FIG. 8 combined with the drop/insert features of FIG. 6. WDMs 1508 and 1534, laser pumps 1510 and 1536, Erbium fibers 1512 and 1532, and attenuators 1522 are constructed, arranged, and operable identically to the corresponding component (same last two digits) of the FIG. 11 design except as noted below. Circulator 1570 has first, second, and third ports 1570F, 1570S, and 1570T with signals circulated clockwise except that port 1570T is isolated from port 1570F.

Attenuators 1522 provide for a flat response curve using one or more of the techniques discussed with respect to the previous optical amplifier designs. However, in-fiber gratings 1572 are controlled by resistors 1574 in the same manner as the controls of the gratings of FIG. 6, it being understood that the controls for resistive heating elements 1574 are not shown in FIG. 15 for ease of illustration. Basically, the gratings 1572 are temperature controlled (or mechanically controlled by stretching and/or compressing) as discussed above such that certain wavelengths are selectively not reflected by any of the gratings such that such wavelength or wavelengths signal(s) are dropped before passage to port 1570T and onto output fiber 1504. For example, first and second wavelengths which would ordinarily be reflected respectively by first and second gratings 1572 (i.e., closest and second closest to port 1570S) may pass right through those gratings if elements 1574 are controlled accordingly, this allowing the dropping of those two wavelengths.

Fiber 1518 having gratings 1572 and attenuators 1522 thereon allows insertion of replacement optical signals at any dropped wavelength or any unused wavelength. Specifically, the end of fiber 1518 remote from port 1570S is connected to port 1576F of circulator 1576. Circulator 1576 has first, second, third, and fourth ports 1576F, 1576S, 1576T, and 1576R with signals circulated clockwise except that port 1576T is isolated from port 1576R. Gratings 1577 and resistive control elements 1578 (functioning and arranged like elements 1574) selectively reflect wavelengths which are to be dropped from the system, such wavelengths having entered port 1576F and exited on the optical fiber at port 1576S. As with the various other paths having gratings discussed above, only a few gratings 1577 and attenuators are shown for ease of illustration, but it will be appreciated that a larger number would often be used. Optional attenuators 1579 may be used to adjust the level of dropped signals which exit out port 1576T onto the optical fiber connected thereto. As an example, FIG. 15 shows two wavelengths being dropped and thus passing out port 1576 and the same two wavelengths being inserted from an optical fiber at port 1576R. (It will be understood that the carrier wavelengths of the dropped and inserted signals may be identical, but the modulation of the signals would be different.) Of course, a smaller or greater number of wavelengths may be dropped and/or inserted. As with the various other paths having gratings discussed above, only a few gratings 1577 and attenuators are shown for ease of illustration, but it will be appreciated that a larger number would often be used.

The added signal or signals inserted at port 1576R pass out port 1576F along fiber 1518 into port 1570S and out port 1570T for passage along to output fiber 1504. The attenuators 1522 may be controlled in the discussed manners to provide a flat response out of fiber 1504.

Figure 16:
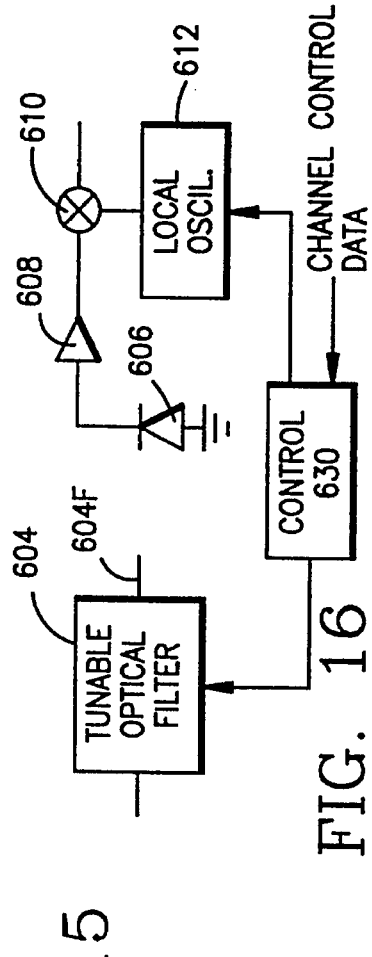
FIG. 16 is a block diagram of a modification of part of the sixth embodiment.

FIG. 16 shows a circulator 1680 and associated components which may be used in place of the circulator 1576 and some associated components of FIG. 16. Gratings 1677 and elements 1678 operate in the same fashion as 1577 and 1578 of FIG. 15 except as noted. If two wavelengths are to be dropped at the same time, the FIG. 16 arrangement provides for the demultiplexing of the two wavelengths if both are to be used locally. Circulator 1680 has first, second, third, fourth, fifth, and sixth ports respectively labeled 1680F, 1680S, 1680T, 1680R, 1680H, and 1680X with signals circulated clockwise. The two gratings 1677 reflect both wavelengths to be dropped such that they pass out port 1680T and one of the wavelengths is reflected by grating 1682 (control element not shown, but could be controllable as discussed for other gratings) back into port 1680T for passage out port 1680R and onto fiber 1685, whereas the other wavelength is provided at fiber 1684. Thus, the two dropped wavelengths are separately available locally.

Port 1680H is connected to fiber 1686 for supplying an inserted wavelength to circulator 1680 for passage out port 1680X onto fiber 1687, reflection by grating 1688 (control element not shown, but could be controllable as discussed for other gratings) back into port 1680X, and passage out port 1680F onto fiber 1618 corresponding to fiber 1518 of FIG. 15. A second inserted wavelength is placed on fiber 1687 for passage into port 1680X, and passage out port 1680F onto fiber 1618 corresponding to fiber 1518 of FIG. 15.

The principle of operation of the circulator 1680 may be used to provide multiplexor and demultiplexor functions for more than the two illustrated wavelengths of FIG. 16. Alternately to the FIG. 16 arrangement, other designs could be used for demultiplexing more than one dropped wavelength and either non-wavelength selective means or wavelength selective means could be used for combining wavelengths to be added.

Figure 17:
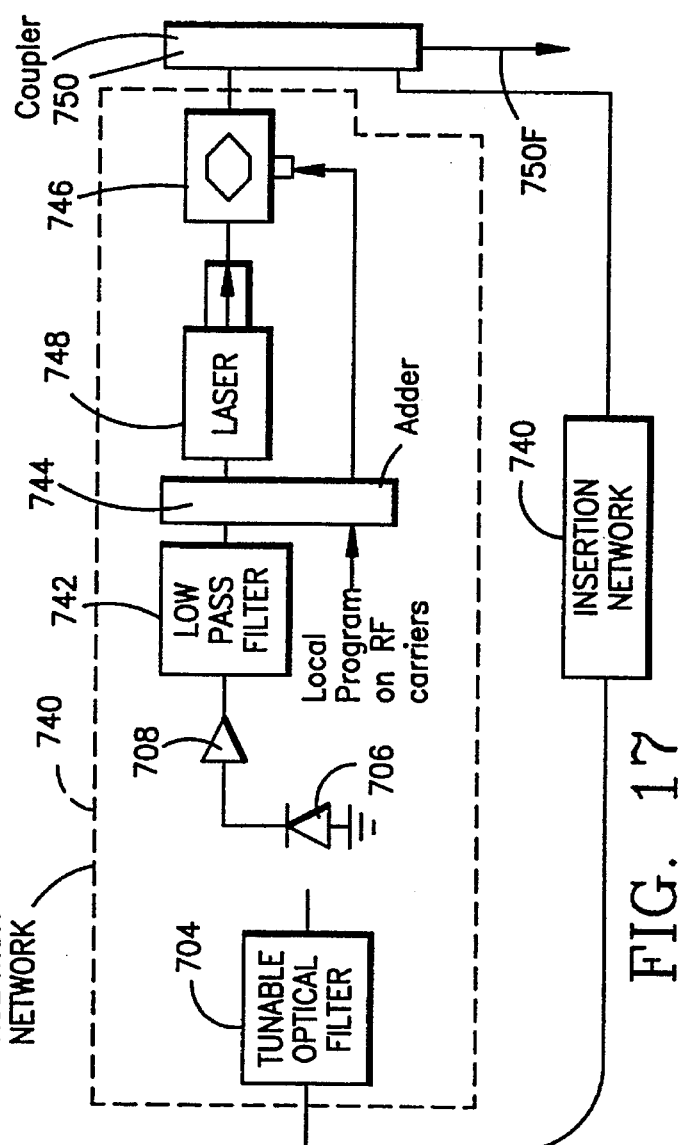
FIG. 17 is a block diagram of a bidirectional amplifier arrangement according to the present invention and which may use any combination of two of the foregoing amplifier arrangements except for the second embodiment which already has bidirectionality.

Bidirectional amplifier system 1700 of FIG. 17 has input/output fibers 1702 and 1704 and is generally operable in similar fashion to the FIG. 10 design. However, circulator 1790 has first, second, and third ports respectively labeled 1790F, 1790S, and 1790T and circulator 1792 has first, second, and third ports respectively labeled 1792F, 1792S, and 1792T. An upper optical amplifier 1794 carries and amplifies signals going from port 1790S to port 1792T, whereas a lower optical amplifier 1796 carries and amplifies signals passing leftwardly from port 1792S to port 1790T. The amplifiers 1794 and 1796 may be constructed like any of the amplifiers 940, 1100, 1200, 1300, 1400, or 1500 (with or without the modification corresponding to FIG. 16) respectively corresponding to FIGS. 8 and 11 through 15.

Although only amplifier 1200 of FIG. 12 has been shown as using Erbium fibers between gratings instead of attenuators for providing a flat response curve, the various other amplifier designs of FIGS. 8, 10, and 12 through 15 could use Erbium fibers as amplitude adjustors between gratings instead of attenuators for providing a flat response curve. An optical fiber having the amplitude adjustors thereon may be considered to be an amplitude adjustment optical fiber. Further, although only the amplifiers of FIGS. 13 and 14 have been shown as having the enhanced reliability associated with continued system operability even after failure of one pump laser, those same illustrated techniques could also be used with the amplifier designs of with FIGS. 8, 10 through 12, and 15.

Various specific constructions and details have been given in the present specification, but it is to be understood that these are for illustrative purposes only. Various modifications and adaptations of the present invention will be apparent to those of skill in the art. Accordingly, the present invention should be determined by reference to the claims appended hereto.

What is claimed is:

1. An optical amplifier system comprising:

a first optical circulator having at least first, second and third circulator ports;

an optical transmission fiber optically communicating with the first circulator port for transporting a wavelength division multiplexed optical transmission signal, the wavelength division multiplexed optical transmission signal comprising plural optical signals of different wavelengths;

a section of optically amplifying rare-earth doped fiber optically communicating with the optical input fiber and with the first circulator port for amplifying the wavelength division multiplexed optical transmission signal input to the first circulator port;

a wavelength-selecting optical fiber having first and second fiber ends, the first fiber end optically communicating with the second circulator port of the first optical circulator, the wavelength-selecting optical fiber including at least one in-fiber Bragg grating for selectively reflecting an optical signal of a particular wavelength from the wavelength division multiplexed optical signal;

a second optical circulator having at least first, second, and third optical circulator ports, the first circulator port of the second circulator optically communicating with the second end of the wavelength-selecting optical fiber; and an optical fiber transmitting optical signals to be added to the wavelength division multiplexed optical transmission signal optically communicating with the third optical circulator port of the second optical circulator.

2. An optical amplifier system as recited in claim 1 further comprising thermal control means for selectively tuning the in-fiber Bragg grating to reflect a particular optical wavelength.

3. An optical amplifier system as recited in claim 1 further comprising mechanical control means for selectively tuning the in-fiber Bragg grating to reflect a particular optical wavelength.

4. An optical amplifier system as recited in claim 1 wherein the wavelength-selecting optical fiber transmits at least one optical wavelength to be dropped from the wavelength division multiplexed optical transmission signal.

5. An optical amplifier system as recited in claim 1 wherein the wavelength selecting optical fiber includes at least first and second in-fiber Bragg gratings.

6. An optical amplifier system as recited in claim 5 further comprising an optical attenuator device positioned between the first and second in-fiber Bragg gratings.

7. An optical amplifier system as recited in claim 1 wherein the at least one in-fiber Bragg grating is positioned at a non-perpendicular axis with respect to the longitudinal axis of the wavelength-selecting optical fiber.

8. An optical amplifier system as recited in claim 1 further comprising a second section of optically amplifying rare-earth doped fiber optically communicating with the third port of the first optical circulator.

9. An optical amplifier system as recited in claim 1 further comprising a second wavelength-selecting optical fiber including at least one in-fiber Bragg grating optically communicating with the second port of the second optical circulator.

* * * * *